Oct. 6, 1936.   T. T. KNAPPEN   2,056,196
MOISTURE METER
Filed April 5, 1934   2 Sheets-Sheet 1

INVENTOR
Theodore T. Knappen
BY
ATTORNEY

Oct. 6, 1936.  T. T. KNAPPEN  2,056,196
MOISTURE METER
Filed April 5, 1934  2 Sheets-Sheet 2

INVENTOR
Theodore T. Knappen.
BY
ATTORNEY

Patented Oct. 6, 1936

2,056,196

UNITED STATES PATENT OFFICE 2,056,196

MOISTURE METER

Theodore T. Knappen, Cairo, Ill.

Application April 5, 1934, Serial No. 719,179

6 Claims. (Cl. 73—51)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a moisture meter for determining the percentage of moisture in an aggregate or other non-soluble, granular material.

One object of this invention is to provide a simple, compact and comparatively inexpensive apparatus of the character described having facilities for affording direct reading with respect to the percentage of moisture in an aggregate to be used in a concrete mixture.

Another object of this invention is to provide an apparatus of the type specified which may be conveniently transported and readily utilized by a mechanic or other person on a construction job, to quickly and accurately determine the amount of moisture contained in sand or other granular material to be used for concrete construction purposes.

With these and other objects in view, this invention consists in certain novel details of construction, combination and arrangement of parts to be more particularly hereinafter set forth and claimed.

Briefly stated, this invention comprises a metering member, adapted to contain a fixed volume of measuring fluid, a mixing chamber in which the measuring fluid and aggregate under test are adapted to be intermingled, a sight tube interconnecting the metering member and mixing chamber and a scale cooperating with the sight tube and calibrated in percentages of moisture, the scale being adjustable with respect to the level of the fluid arising within the tube from the mixing chamber.

Referring more particularly to the accompanying drawings in which corresponding parts are indicated by similar reference characters:

Figure 1:
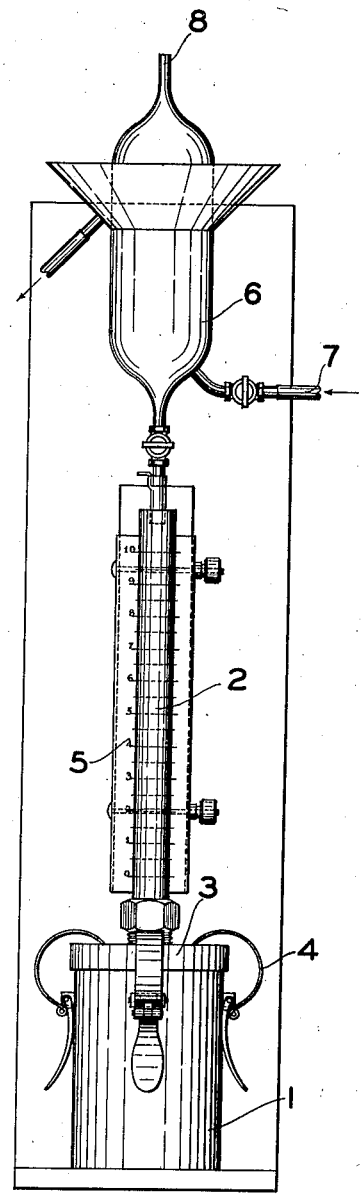
Fig. 1 is a front elevation of my improved measuring apparatus.
Figure 2:
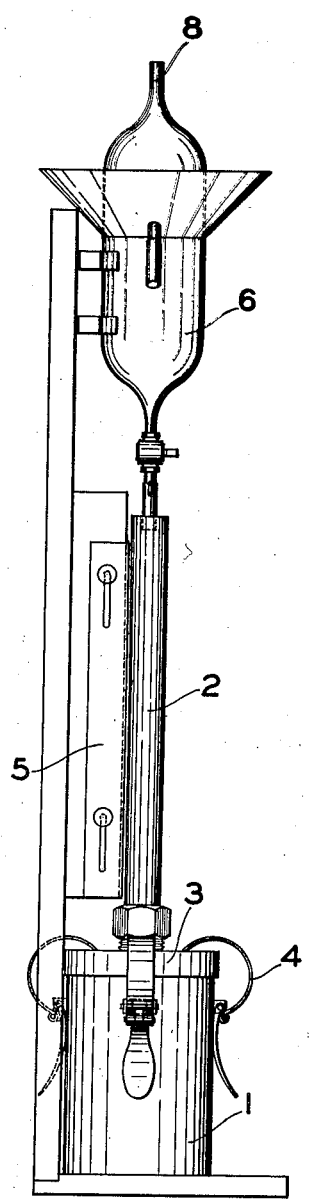
Fig. 2 is a side elevation thereof.
Figures 3, 4:
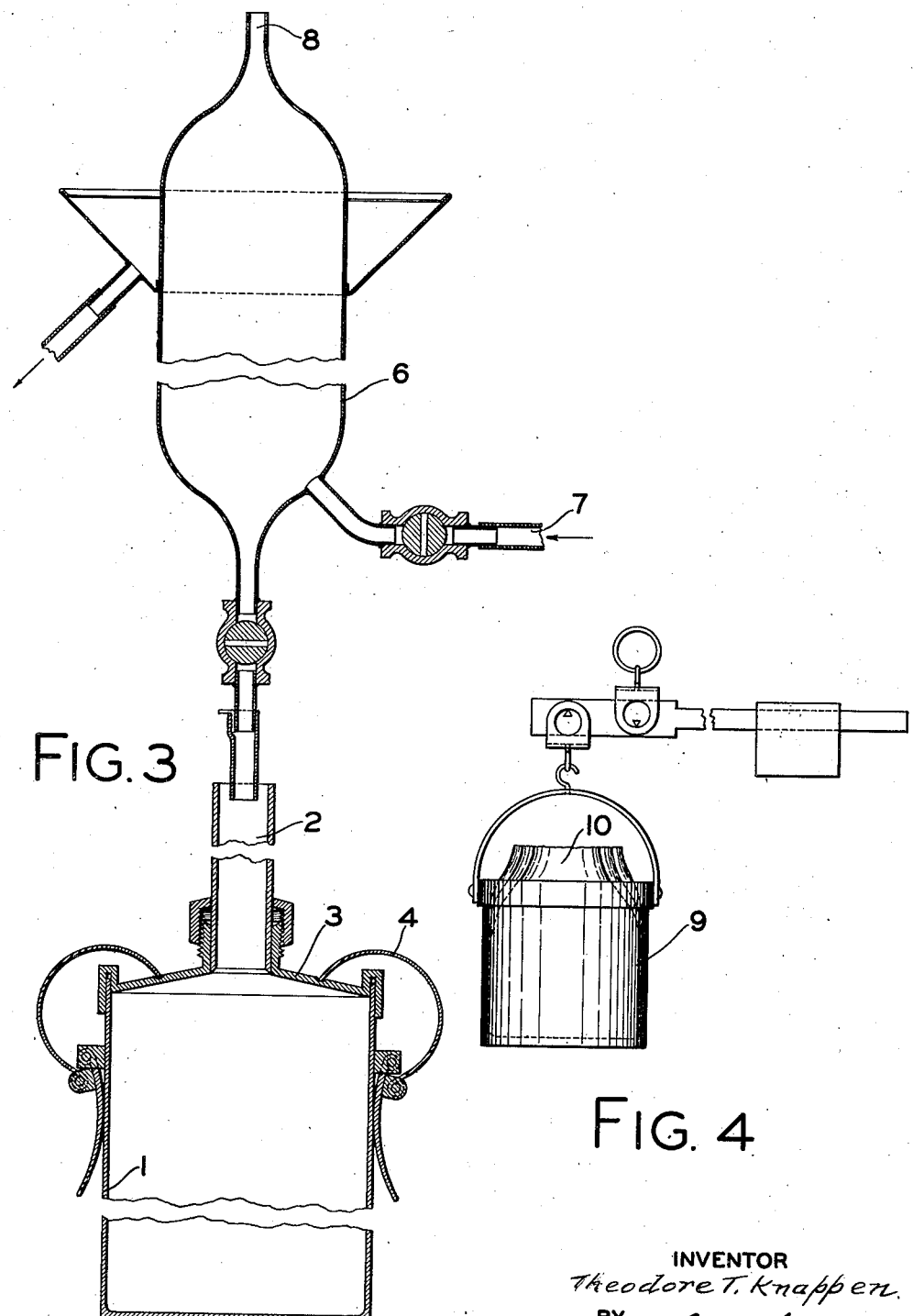
Fig. 3 is a sectionized fragmentary enlargement of my improved apparatus with parts shown in elevation.
Fig. 4 is a fragmentary detail partly in elevation of scale arm, adjustable weight and weighing bucket suspended from one end of the arm.

In the modern methods of concreting, the total amount of water entering the mixer is desired and this water includes the free moisture in the aggregates. Sand, being a reasonably fine material through which the movement of water is relatively slow, does not have a uniform moisture content and the percentage of moisture contained at various points in the stockpile varies considerably. In the past, the amount of water introduced with the sand has been variously estimated by drying the sand and by several pieces of apparatus based on the displacement of a known weight of sample varying in proportion to the percentage of moisture. The drying of the sand consumes considerable time and if it is determined by a single sample, the conditions are often changed before the results are available for use. If it is determined from a composite sample secured from various parts of the stockpile, the result is an average for the entire pile and the variance from this average will be such as to seriously effect the results. The various devices now available for securing the percentage of moisture, which devices are based on the varying resulting volume when a known weight of sample is added to a known volume of water, require either very delicate measuring and weighing equipment, fail to secure the desired accuracy, or require excessive time for operation.

In this improved type of equipment I propose to use a large container (1) for the larger portion of the water and sample, with a small tube (2) rising from the cover of this large container. The sample and the major portion of the water can be quickly placed in this container. After the cover (3) and small tube are attached, the remainder of the water is added through the tube.

The variance in volume between a certain weight of dry sample plus a definite volume of water and the same weight of damp sand plus the same volume of water can be closely determined in this tube. This large container can be constructed of any non-absorbent material, fitted with a cover (3) with a water-tight seal and held by clamps (4) to the main flask. This cover is given a slight dome to better free any entrapped air. A small tube is fastened in the center of this cover with a water-tight connection and extends into the main flask. Fastened to this tube is a scale (5) which is marked at zero for surface dry sand and is graduated in percentages of moisture in the sample. The scale is fitted so that its zero can be set opposite the water level for a trial sample of surface dry sand and the definite volume of water. The height of water in the tube for the surface dry sample will vary with the specific gravity of the sand and it is necessary to secure its first setting for any sand from a single source by trial. When this setting has been established, it will not be necessary to change the setting unless the specific gravity changes. The setting of the scale should be checked a few times each week and whenever the apparent characteristics of the sand changes. The graduations of the scale should theoretically vary with the variation of the specific gravity of the sand, but this is smaller than the accuracy desired for the field work and only one scale is planned to be used, the graduations being those for an average value of the specific gravity. The graduations of the scale are determined from the basic formula:

Percentage of surface moisture $= \dfrac{\dfrac{V-V_1-V_2}{2.62}}{V_1+V_2-V} \times 100$ Where "V" is the combined volume of sample and water, measured in cubic centimeters; $V_2$ is the volume of water added in cubic centimeters; 2.62 is the average specific gravity of the sand; $V_1$ is weight of sample measured in grams. For laboratory work different scales are used, the graduations being determined from the specific gravity of the sample.

The volume of water is measured in a container (6) of determined and constant volume, the container being filled to overflow each time by a tube (7) attached to the water supply line. This tube enters the container with an upward turn so as to give a constant and unvarying volume by restraining a constant amount of water in the filling tube. The device ends in a small open ended tube (8) which may be filled to hold the exact amount of water desired. The container when filled overflows through this tube, which overflow is caught and conducted to the wast. A simple balance of 4-pound capacity with a bucket (9) on one end of the arm and a weight which balances the bucket, sample, and sample container on the other, completes the apparatus. Bucket (9) is provided with a suitable closure (10). The balances are of the type used for weighing grain samples.

Having described the physical features of this apparatus, the procedure of operation follows:

(a) Determination of the setting of the zero of the scale: A representative sample of the sand to be worked with, in a saturated surface dry condition is selected. A fixed amount, usually 2000 grams is weighed out and a fixed amount of water, usually 1200 c. c. is placed in the water measuring apparatus. The large container is about two-thirds filled with water, the sand sampled added slowly and stirred to release any entrapped air. The cover is then clamped on the container, the remainder of water added through the tube, and the container shaken to release any air. The zero of the scale is then set at the water level and the operation repeated for a check. This operation is only needed when work is begun on a project or to check the scale against slipping, or to check any change in the characteristics of the sand.

(b) Sand sampling and weighing: For ease in handling and to maintain a constant moisture content from the time of sampling to time of test, water-proof sacks of uniform weight and size are used. The sample weighing over 2000 grams is placed in the sack at place of sampling and the sack closed and the sample is taken to the place of test, placed in balance bucket and sand is removed until the weight of the sample is exactly 2000 grams. The water measuring device is filled with 1200 c. c. and a portion of this is then run into the large container until it is about two-thirds full. The sand sample is sifted into the water and stirred to remove entrapped air and any foam skimmed off. The container cover is then clamped on and the remainder of the water run into the container through the tube. The percentage of moisture in the sample is then read direct on the scale.

(c) Measuring water: The accuracy of this method depends on getting exactly the same volume of water each time, the rapidity depends on getting this volume quickly and conveniently. This has been done by the water measuring device described above. It is only necessary to attach this device to pressure line and fill to overflowing. Any part of this water can be drawn off at one time by turning the valve. A bleeder is introduced where the flexible rubber tube attaches to the metal measurer.

Having thus described my invention, what I claim as new and desire to secure by Letters Patent is:

1. An apparatus for determining by direct reading the percentage of moisture in an aggregate comprising a metering device, a filling and an overflow means in connection with the metering device adapted to afford a constant volume of measuring fluid, a water-tight mixing chamber in which the aggregate under test and the measuring fluid are adapted to be intimately mixed, a sight tube communicating at one end with the interior of the mixing chamber and at the other with the metering device, means in connection with the metering device to permit discharge of the measuring fluid from said device through the tube to the mixing chamber and a scale calibrated in percentages of moisture and associated with said tube, the scale being adjustable with respect to the level of the measuring fluid ascending the tube, after discharge of the measuring fluid into the mixing chamber.

2. An apparatus for determining by direct reading the percentage of moisture in an aggregate comprising a metering device, a filling and an overflow means in connection with the metering device, adapted to afford a constant volume of measuring fluid, a water-sealed mixing chamber located beneath the measuring device, the mixing chamber serving to permit the intimate mixing of the aggregate under test and the liquid in said measuring device, a sight tube communicating at its lower end with the mixing chamber and at its upper extremity with the metering device, the tube forming a conduit for the passage of the measuring fluid from the metering device to the mixing chamber, means to permit the discharge of liquid from the metering device through the tube to the mixing chamber a scale calibrated in percentages of moisture operatively associated with the sight tube, the scale being adjustable with respect to the level of the liquid arising in the tube after it has been discharged into the mixing chamber.

3. An apparatus for determining by direct reading, the percentage of moisture in an aggregate consisting of a metering device, a filling and an overflow means in connection with the metering device adapted to afford a constant volume of measuring fluid and a water sealed mixing chamber situated beneath the metering device, said chamber permitting the mixture of measuring fluid and aggregate under test, a sight tube communicating at one end with the interior of the mixing chamber and at the other with the measuring device, and forming a passageway for the fluid from the metering device to the mixing chamber, means for controlling the flow of liquid from the metering device through the tube to the mixing chamber, a scale operatively disposed with respect to the tube and calibrated in percentages of moisture, the scale being adjustable with respect to the level of the fluid arising in the tube from the mixing chamber, after the discharge of measuring fluid from the metering device to the mixing chamber.

4. An apparatus for determining by direct reading, the percentage of moisture in an aggregate, comprising a metering device, a filling and an overflow, means in connection with the metering device adapted to afford a constant volume of measuring fluid, a water-sealed mixing chamber located beneath the measuring device, said chamber having a dome-shaped head, a vertically disposed sight tube communicating at one end with the interior of the mixing chamber and at the other end with the measuring device, said tube forming a passageway for the flow of fluid from the metering device to the mixing chamber, means for controlling the flow of measuring fluid from the measuring device to the mixing chamber, a scale juxta-positioned with respect to the tube and calibrated in percentages of moisture the scale being adjustable with respect to the level of the water arising in the tube from the mixing chamber, after the contents of the metering device have been discharged into the mixing chamber.

5. An apparatus for determining by direct reading the percentage of moisture in an aggregate comprising a metering device, a filling and an overflow means in connection with the metering device adapted to afford a constant volume of measuring fluid, a sight tube communicating at its upper end with the metering device, means for controlling communication between the metering device and sight tube, a scale associated with and adjustable lengthwise of the sight tube, an aggregate container, a combined cover and water-seal attached to the lower end of the sight tube and means associated with the container for detachably securing said closure to the container.

6. An apparatus for determining by direct reading the percentage of moisture in an aggregate, comprising a metering device, a filling and an overflow, means in connection with the metering device adapted to afford a constant volume of measuring fluid, a sight tube communicating at its upper end with the metering device, means controlling communication between the metering device and sight tube, an aggregate container, a combined water-seal and cover for the aggregate container attached to the lower end of the sight tube and a series of clamping elements carried by the container and cooperating with the cover to secure the latter in watertight engagement with the container.

T. T. KNAPPEN.